Patented June 30, 1936

2,045,759

UNITED STATES PATENT OFFICE 2,045,759

PROCESS FOR INCREASING THE PRODUCTIVITY OF WELLS

Melvin De Groote, St. Louis, Mo., assignor to Tretolite Company, Webster Groves, Mo., a corporation of Missouri No Drawing. Application February 17, 1936, Serial No. 64,349

5 Claims. (Cl. 166—21)

This invention relates to a novel process for increasing the productivity of deep wells, such as oil wells, gas wells, water wells and brine wells. In view of the fact that the most important industrial application of the process is concerned with oil wells, I will hereinafter describe how the process is used to increase the output of oil wells.

When an oil well is drilled into an oil-bearing stratum, the release of pressure upon the oil deposit may cause the oil to flow naturally for a certain period of time, after which the volume of flow will, in most instances, gradually decrease to a point or degree where some procedure, such as pumping, must be employed, so as to insure the production of a profitable amount of oil. Thereafter, production may continue to decline until the quantity of oil obtained from the well is so small that it is not commercially practicable to continue the well in operation. In some instances the stoppage of oil output or decline in production, above referred to, is not caused by exhaustion of the oil supply, but, on the contrary, is caused by building up of solid deposits of wax, or of inorganic salts, in the channels or pores of the oil-bearing rock. The productivity of wells of the kind above mentioned may, in some instances, be wholly, or at least partially, regenerated by mechanical means, such as the use of an explosive, but there are various objections to such mechanical treatment, such as the high cost and danger of injuring the internal well structure itself.

In such instances where the hydrocarbon gases, escaping from a well, lower the solubility of wax or paraffin bodies in the oil, with the result that wax or paraffin-like bodies are deposited in the oil-bearing stratum, one is confronted with considerable difficulty in attempting to remove such wax or paraffin-like bodies, due to their chemical inactivity. Asphaltic materials may act the same as wax. Indeed, it is not necessary for the oil-bearing strata to be clogged entirely with wax or paraffin-like bodies, but, on the contrary, a mere coating or film of wax or paraffin on calcareous matter sometimes prevents ordinarily effective acid-treating agents, such as hydrochloric acid, from combining with or removing the calcareous deposit, and thus presents the same sort of difficulty.

There are a number of methods or processes, involving the use of hydrochloric acid, that are effective for treating a clogged oil-bearing stratum consisting of a lime sand, a limestone, or a formation related to calcareous or magnesian formation, provided the clogging is due essentially to uncoated calcium carbonate or magnesium carbonate, or the like. This is also true in such siliceous or similar strata, from which petroleum oil is derived, where there is a clogging of the oil sands, due to the presence of alkaline earth carbonates, and primarily calcium carbonate. It is believed that the subterranean water becomes saturated with calcium bicarbonate under pressure, and that when the well is drilled and pressure released, some of the subterranean water escapes with the oil, with the result that the solubility of the calcium carbonate or bicarbonate in the remaining subterranean water becomes reduced to such an extent or degree that precipitation takes place in the pores of the siliceous sand in the oil-bearing stratum. So far as the usual hydrochloric acid treatment is concerned, it is immaterial whether the formation itself is truly calcareous, or is a siliceous formation with a calcareous deposit. Naturally, magnesium carbonate deposits are susceptible to treatment as calcium carbonate deposits.

Obviously, if hydrochloric acid treatment is applied to an oil-bearing limestone formation, it may not only remove any deposited calcium carbonate, or the like, but it may increase the porosity of the limestone structure itself. Therefore, in actual use, the increased productivity is not limited to the removal of the relatively recent calcium deposit, but it may also be concerned with the increased natural porosity of the aged oil-bearing stratum itself. Some oil-bearing strata are not essentially calcareous in character, but may essentially be siliceous in character, or else, may represent limestone so high in siliceous content, that there is limited or no chemical reactivity towards hydrochloric acid.

U. S. Patent No. 1,922,154, dated August 15, 1933, to Melvin De Groote, describes a method of treating clogged oil-bearing strata by means of emulsified acid, particularly hydrochloric acid, etc. I have found that in certain instances a very desirable mixture consists of hydrochloric acid and nitric acid in ratio of approximately 4 to 1 and in fairly high concentrations. It is to be noted that this ratio is substantially the same as is employed in the manufacture or production of aqua regia. I have found that such mixture of hydrochloric and nitric acids are particularly effective, and I attribute this effectiveness to the ability to oxidize or in some other suitable way destroy the oily or waxy film which may encase the calcareous or magnesian structure, and thus prevent reaction with ordinary hydrochloric acid. It is well known, of course, that nitric acid, in addition to having the acid properties of hydrochloric acid, is further characterized by being an oxidizing agent, and it is also known that mixtures of hydrochloric acid and nitric acid may liberate certain oxidizing agents, possibly chlorine, or new compounds having both chlorine and nitrogen present in the molecule along with oxygen.

When the nitric acid employed is relatively low in proportion to the hydrochloric acid, for instance, the 98 to 2 ratio suggested in the De Groote patent previously mentioned, I find that the emulsified acid solution can be prepared in the customary manner, and that it exhibits the anticipated characteristics. However, when the ratio approaches approximately 4 to 1 and the acid is somewhat more than mere dilute acid, it is rather difficult to prepare an emulsion that will not show some signs of incipient breaking, even before it has completely passed the metal working parts of the well. I know of no inhibitor which is effective in connection with nitric acid, or more particularly, in connection with mixtures of nitric and hydrochloric acid. I have found that if separate emulsions are made of nitric acid and of hydrochloric acid, such emulsions may be mixed together, and since the hydrochloric and nitric acids are thus kept separate prior to demulsification in the strata, one does not encounter the difficulty previously mentioned.

Therefore, as an improvement in the process described in the aforementioned De Groote patent, and particularly, in those formations which seem to contain a coating of oily or waxy matter, I find it most desirable to treat the formation with an emulsion containing unmixed nitric and hydrochloric acids as the dispersed phase of an acid-in-oil emulsion. It is understood, of course, that the ratio of 4 parts of hydrochloric acid to 1 of nitric, applies to the original concentrated commercial acids before dilution. After dilution, the ratio might be entirely different, as, for example, 1 volume of hydrochloric acid might be diluted with 3 volumes of water, whereas, 1 volume of nitric acid might be diluted with 10 volumes of water. However, I have found it most desirable to employ the acids in the ratio of 4 to 1, as previously referred to, and this ratio is based on the concentrated acids prior to dilution. The ratio of 4 to 1 need not be considered absolutely without variation, but some reasonable variations are permissible, say, variations within the range of 3 to 1, or 5 to 1, but the preferred ratio is 4 to 1. I prefer to dilute the acids to a reasonable degree, but not to extreme dilution, such as less than 5% of concentrated acid, by volume, per 100 volumes of dilute acid.

The following is an example of the preferred procedure for practicing my process: Crude oil containing a large amount of naturally-occurring emulsifying agent, such as some of the heavier black oils found in the Eldorado-Smackover area of Arkansas, is employed as the oily vehicle. To 400 gals, of such oil, 100 gals. of 15% hydrochloric acid (prepared by diluting 15 volumes of concentrated acid to 100 volumes of solution) is added and thoroughly emulsified. If a reasonably stable emulsion is not obtained, then sufficient oil-soluble petroleum sulfonate in the form of a sodium salt is added to give a stable emulsion. Similarly, an emulsion containing 25 gals. of 15% nitric acid (prepared by diluting 15 volumes of concentrated acid to 100 volumes of solution) is emulsified with 100 gals. of crude oil of the same kind and in the same manner just described. This second emulsion is then mixed with the first emulsion, so as to produce a homogeneous emulsion which is forcibly ejected into the strata according to the conventional methods. It is to be noted that this emulsion contains two distinctly separate internal phases, the one being moderately dilute hydrochloric acid, and the other being moderately dilute nitric acid. If desired, even a third aqueous phase could be added, which consists of a suitable fluoride, for instance, a suspension or solution of sodium fluoride or calcium fluoride in water, and subsequently, dispersed in oil in the manner described in my co-pending application for patent Serial No. 55,614, filed December 21, 1935. It is to be noted that the combination of nitric acid and hydrochloric acid is effective in many instances in destroying the waxy film, but it is not effective in destroying siliceous films or siliceous matter, if present. In such event a fluoride, particularly sodium fluoride, must be employed. For example, if desired, 10 gals. of a 10% aqueous suspension or solution of sodium fluoride might be emulsified with 30 gals. of oil, as previously noted, and then admixed with the hydrochloric-nitric acid emulsions, previously described. An injection of such an emulsion into the well would be very effective, in many instances, in removing both the waxy matter and various amounts of interfering siliceous matter, and also removing the principal calcareous or magnesian deposits.

Having thus described my invention, what I claim as new and desire to secure by Letters Patent is:

1. A process for increasing the productivity of wells, characterized by introducing into the well an emulsified treating medium whose internal phase consists of emulsified, unmixed, hydrochloric acid and nitric acid in at least moderate concentrations, the ratio of unmixed acid being within the range of 5 to 1 or 3 to 1, respectively, on the basis of the original concentrated acids themselves, the external phase of said emulsion consisting of an oily vehicle with a hydrophobe emulsifier, said emulsion being adapted to break after reaching the oil-bearing strata at the bottom of the well, whereupon the unmixed acids will commingle and re-act.

2. A process for increasing the productivity of wells, characterized by introducing into the well an emulsified treating medium whose internal phase consists of emulsified, unmixed, hydrochloric acid and nitric acid in at least moderate concentrations, the ratio of unmixed acid being within the approximate ratio of 4 to 1, respectively, on the basis of the original concentrated acids themselves, the external phase of said emulsion consisting of an oily vehicle with a hydrophobe emulsifier, said emulsion being adapted to break upon reaching the oil-bearing strata at the bottom of the well, whereupon the unmixed acids will commingle and re-act.

3. A process for increasing the productivity of wells, characterized by introducing into the well an emulsified treating medium whose internal phase consists of emulsified, unmixed, hydrochloric acid and nitric acid in a strength representing at least 5% of concentrated acid per 100 volumes, the ratio of unmixed acid being within the approximate ratio of 4 to 1, respectively, on the basis of the original concentrated acids themselves, the external phase of said emulsion consisting of an oily vehicle with a hydrophobe emulsifier, said emulsion being adapted to break, upon reaching the oil bearing strata at the bottom of the well, whereupon the unmixed acids will commingle and re-act.

4. A process for increasing the productivity of wells, characterized by introducing into the well an emulsified treating medium whose internal phase consists of emulsified, unmixed, hydrochloric acid and nitric acid in a strength representing at least 15% or more of concentrated acid per 100 volumes, the ratio of unmixed acid being within the approximate ratio of 4 to 1, respectively, on the basis of the original concentrated acids themselves, the external phase of said emulsion consisting of an oily vehicle with a hydrophobe emulsifier, said emulsion being adapted to break, upon reaching the oil-bearing strata at the bottom of the well, whereupon the unmixed acids will commingle and re-act.

5. A process for increasing the productivity of wells, characterized by introducing into the well an emulsified treating medium composed of an emulsified aqueous solution-suspension of a suitable fluoride together with emulsified, unmixed, hydrochloric acid and nitric acid in a strength representing at least 15% or more of concentrated acid per 100 volumes, the ratio of unmixed acid being within the approximate ratio of 4 to 1, respectively, on the basis of the original concentrated acids themselves, the external phase of said emulsion consisting of an oily vehicle with a hydrophobe emulsifier, said emulsion being adapted to break, upon reaching the oil-bearing strata at the bottom of the well, whereupon the unmixed acids will commingle and re-act.

MELVIN DE GROOTE.